J. C. & W. J. POPE.
MANURE SPREADER.
APPLICATION FILED NOV. 11, 1912.

1,067,373.

Patented July 15, 1913.
4 SHEETS—SHEET 1.

Fig. 1.

Witnesses:
Milton Lenoir
E. M. Klatcher

Inventors:
John C. Pope
and William J. Pope.
By Gillson & Gillson
Attorneys.

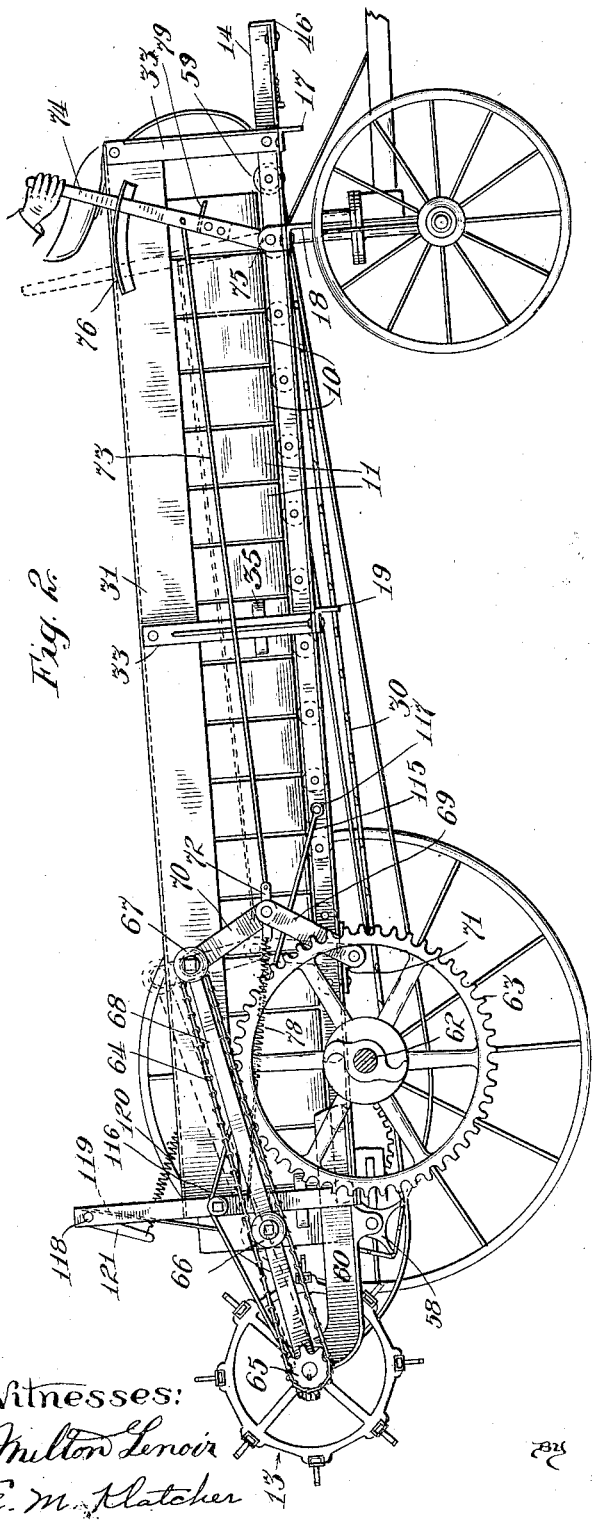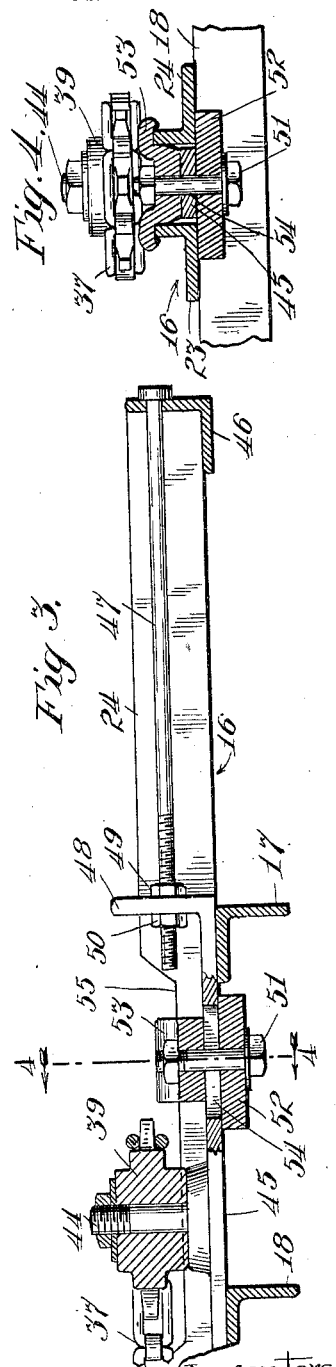

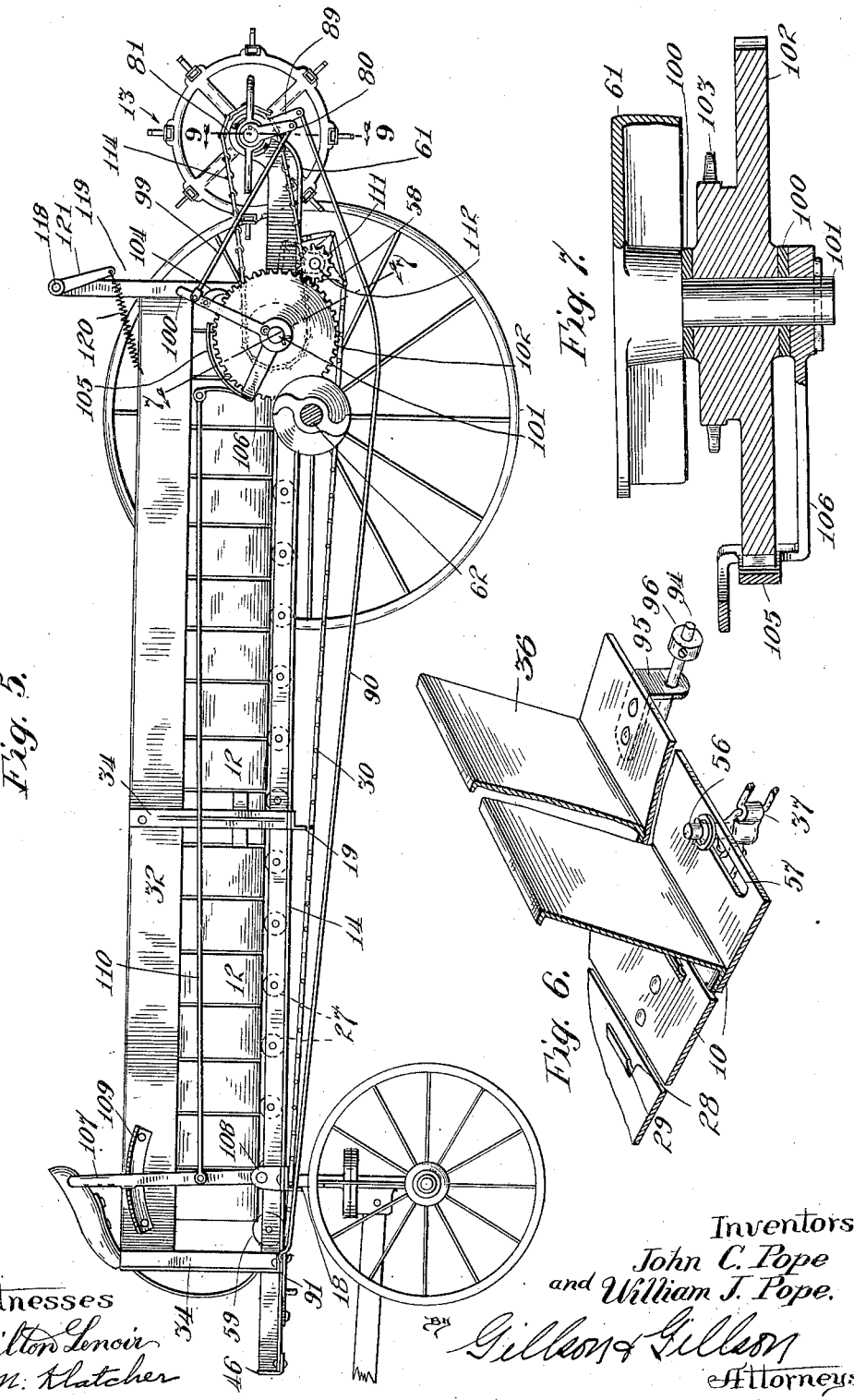

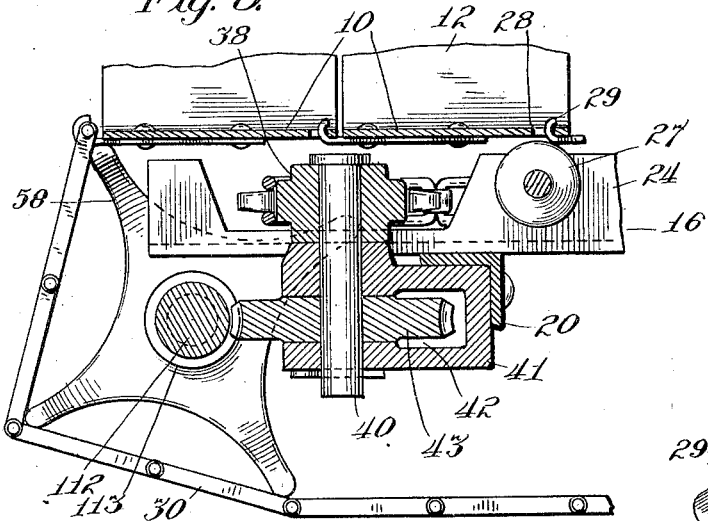
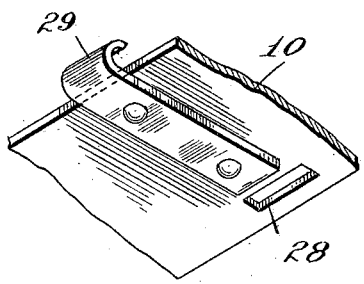
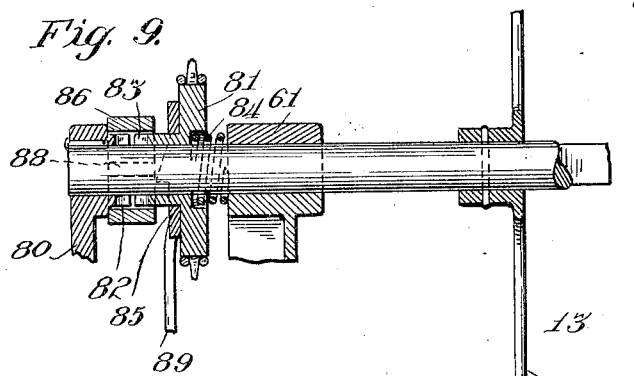
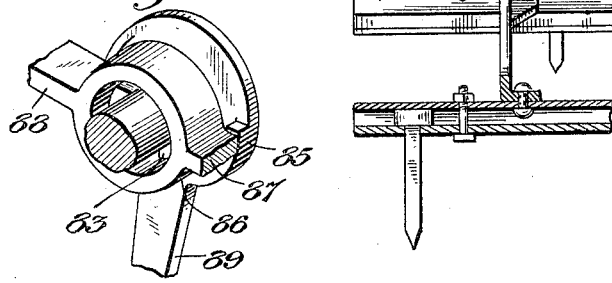

UNITED STATES PATENT OFFICE.

JOHN C. POPE AND WILLIAM J. POPE, OF PLANO, ILLINOIS.

MANURE-SPREADER.

1,067,373.

Specification of Letters Patent.

Patented July 15, 1913.

Application filed November 11, 1912. Serial No. 730,702.

*To all whom it may concern:*

Be it known that we, JOHN C. POPE and WILLIAM J. POPE, citizens of the United States, and residents of Plano, county of Kendall, and State of Illinois, have invented certain new and useful Improvements in Manure-Spreaders, of which the following is a specification, and which are illustrated in the accompanying drawings, forming a part thereof.

The invention relates to manure spreaders, and has for its object to provide a machine which shall be effective in use and of such simple construction as to reduce its initial cost and the liability of its getting out of order, as also to require but little power for its operation.

In the accompanying drawings—Figure 1 is a plan view of a manure spreader embodying the features of improvement provided by the invention, some of the parts being broken away; Fig. 2 is a side elevation of the same, one of the rear carrying wheels being removed and the rear axle being shown in section; Fig. 3 is a detail central longitudinal sectional view taken on the line 3—3 of Fig. 1; Fig. 4 is a detail sectional view taken on the line 4—4 of Fig. 3; Fig. 5 is similar to Fig. 2 but shows the other side of the machine; Fig. 6 is a detail perspective view illustrating a form of driving connection which is preferably employed upon the machine; Fig. 7 is a detail sectional view taken on the line 7—7 of Fig. 5; Fig. 8 is a detail sectional view taken on the line 8—8 of Fig. 1; Fig. 9 is a sectional view taken on the line 9—9 of Fig. 5; Fig. 10 is a perspective view showing a detail of the apron construction and Fig. 11 is a detail perspective view illustrating a form of clutch mechanism which may be used upon the machine.

The invention is preferably applied to machines of the general type having a body which resembles in general form the body of a farm wagon, and is provided with distributing apparatus at its rear end and with a movable apron for supporting the load and feeding it to the distributing apparatus. The machine illustrated is of the specific type known as return apron spreaders.

The apron shown is composed of a plurality of sections 10 connected edge to edge. Preferably these sections follow the form disclosed in our Patent No. 901,123, dated October 13, 1908, and are each provided with upturned ends 11, 12, forming sides for the hopper and serving to prevent lateral displacement of the load as it is presented to the distributing apparatus. The distributing apparatus conveniently takes the form of a revolving beater or drum 13.

The frame of the machine is preferably constructed of metal, and comprises longitudinal side sills 14, 15, an intermediate longitudinal sill 16, and transverse sills 17, 18, 19 and 20. All of these sills are conveniently formed from angle irons. As shown, each of the longitudinal sills comprises a pair of such bars, as 21, 22, 23, 24, and 25, 26, the bars of each pair being spaced apart to receive anti-friction rollers, as 27, between them for supporting the apron. The slats 10 of the apron are preferably also formed of metal, as from metal sheets cut and formed to the desired shape. When so formed their adjacent edges are connected by providing apertures, as 28, at intervals adjacent one edge of each slat, and by mounting hooks 29 upon the slats to project beyond the edge remote from the apertures 28 for engaging the said apertures of the next adjacent slats. In the form shown only a sufficient number of slats 10 are provided to form an apron extending from end to end of the frame. When so constructed the two ends of the apron are connected to form a complete loop, as by chains 30, extending between the end slats 10 of the apron. This loop turns about guide wheels 58, 59, located adjacent the opposite ends of the frame. Each of the guide wheels 59 is mounted upon one of the longitudinal sills, as 14, 15. The guide wheels 58 preferably take the form of sprockets, and are loosely mounted upon a shaft 112 which extends transversely through the frame of the machine adjacent its rear end.

The upturned ends 11, 12, of the slats 10 are supplemented, in forming sides for the hopper, by plates 31 and 32, one of which extends along each side of the frame of the machine. These plates are preferably supported by uprights, as 33 and 34, rising from the corresponding side sills 14, 15. To prevent the upturned ends 11, 12, of the slats 10 binding against the uprights 33, 34, in event of lateral displacement of the load, as when the machine is used upon a sloping field, certain of the uprights 33, 34, are provided with guide shoes 35 for engagement with the upturned ends 11, 12, of the slats. The slat 10 of the apron nearest the forward end of the machine is provided with an upstanding plate 36 which serves as a follower board.

If desired a horizontally disposed continuous feed chain 37 may be employed for moving the apron. As shown, this chain turns about sprockets 38 and 39 located centrally upon the frame of the machine adjacent its opposite ends. The sprocket wheel 38 is fixed upon a short vertical shaft 40, most clearly shown in Fig. 8 of the drawings. This shaft is journaled in a bracket 41 fixed upon the rearmost transverse sill 20 of the frame. The bracket 41 is recessed, as indicated at 42, to receive a worm wheel 43 mounted on the shaft 40 below the sprocket wheel 38.

The sprocket wheel 39 is most desirably adjustably mounted in the frame of the machine, as in the manner illustrated in Figs. 3 and 4. To this end it is fitted upon a stud 44 carried by a plate 45. The plate 45 is slidingly mounted between the angle bars 23, 24, of the intermediate sill 16, and rests upon the transverse sills 17, 18. The angle bars 23, 24, of the intermediate sill 16 are extended in front of the front end sill 17, and carry a transverse bar 46 at their forward ends. The bar 46 is shown as being formed of angle iron, and extends beyond the bars 23, 24, at each side to serve as a foot rest for the operator. It also serves as a stop for supporting the forward end of an adjusting bolt 47. This bolt is extended through the upright flange of the bar 46 and through the upturned end 48 of the plate 45. Nuts 49 and 50, running on the bolt 47 at opposite sides of the part 48, serve for adjustably moving the plate 45 to regulate the distance between the sprocket wheels 38 and 39.

A clamp, comprising a bolt 51 and washers 52, 53, serves for fixing the plate 45 in adjusted position. As shown, the bolt 51 is extended through a slotted aperture 54 in the plate 45, and the washers 52, 53, serve for engaging the upper and lower margins of the angle bars 23, 24.

Preferably the upstanding flanges of the angle bars 23, 24, are recessed, as indicated at 55, to provide clearance for the sprocket wheel 39 and chain 37. The chain 37 is operatively connected to the apron, as by means of a stud 56 mounted on the chain and projecting through an aperture 57 in one of the slats 10 of the apron (Fig. 6). Preferably the aperture 57 is of slotted form to accommodate the transverse movement of the stud 56 in passing about the sprocket wheels 38 and 39.

The distributer 13 extends between and is journaled at its opposite ends in bracket arms 60 and 61. These bracket arms are respectively secured to and form rearward extensions of the two side sills 14 and 15. The rear apron shaft 112 is journaled adjacent its opposite ends in the bracket arms 60 and 61.

Power for operating the several parts of the machine is preferably derived from the rear axle, as 62, and is transmitted to the apron through the beater 13. By means of this arrangement only a single sprocket wheel 63 is required to be mounted on the rear axle 62. This sprocket wheel is preferably fixed upon the axle at one side of the machine, and rotates continuously with the axle during the movement of the machine over the ground.

A sprocket chain 64 serves for transmitting power from the sprocket wheel 63 to the beater 13 when it is desired that the several parts of the machine should be operated. As shown, the sprocket chain 64 turns over a sprocket wheel 65 fixed upon an end of the beater shaft, and over guide pulleys 66 and 67. The guide pulleys 66 and 67 are rotatably mounted upon one side of a lever arm 68. This lever arm is pivoted upon the beater shaft at one end and projects forwardly therefrom over the sprocket wheel 63. The forward end of the arm 68 is adjustably supported by a toggle comprising links 69 and 70, whereby the sprocket chain 64 may be raised and lowered into and out of engagement with the sprocket wheel 63. One of the links, as 69, of the toggle is pivotally supported at its lower end upon a bracket 71 carried by the side sill 14. The two links 69, 70, are pivotally united at 72, and the other end of the link 70 is pivotally attached to the outer end of the lever arm 68.

An operating rod 73 is connected to the toggle pivot 72 at one end, and extends forwardly therefrom to a hand lever 74 located adjacent the forward end of the machine. This hand lever is pivotally secured at its lower end to a bracket 75 carried by the side sill 14, and extends upwardly therefrom through a slotted guideway 76 to a position within convenient reach from the driver's seat. The slotted guideway 76 is preferably mounted upon the side of the plate 31. As shown, the guideway 76 is provided with a shoulder 77 adjacent its forward end. This shoulder may be engaged by the hand lever 74 to hold the hand lever in its forward position. A spring 78 reacts between the rear end of the rod 73 and a rigid part of the frame, as the upright 33 at the rear of the machine, to retract the hand lever 74 and raise the sprocket chain 64 out of engagement with the sprocket wheel 63.

When the machine is in operation the hand lever 74 is engaged with the shoulder 77. A cam lug 79, mounted upon the upturned end 11 of one of the slats 10 of the apron, engages the hand lever 74 to release it from the shoulder 77 when the apron reaches the limit of its return movement. The spring 78 then serves to raise the sprocket chain 64 out of engagement with the sprocket wheel 63 to arrest the action of the operative parts of the machine. By reason of the presence of the cam lug 79 at the side of the hand lever 74 when the operation of the machine is to be begun, it follows that in starting the machine the operator must hold the hand lever 74 in its forward position until the apron has been retracted far enough to permit the hand lever 74 to be engaged with the stop shoulder 77 in front of the cam lug 79.

A crank arm 80 and a sprocket wheel 81, mounted on that end of the beater shaft remote from the sprocket wheel 65, serves for transmitting power from the beater 13 to the apron. The crank arm 80 serves for driving the apron at low speed, as when the load is being moved toward the beater. The sprocket wheel 81 is employed for driving the apron at its higher speed, as when it is being returned to the loading position. The crank-arm 80 rotates with the beater shaft at all times.

The sprocket wheel 81 is loosely mounted on the beater shaft, and clutch mechanism, most clearly shown in Fig. 9, is provided for causing the sprocket wheel to turn with the shaft. This clutch mechanism comprises an annular series of clutch teeth 82 formed upon the inside face of the hub of the crank arm 80 and a coöperating series of clutch teeth 83 formed on the hub of the sprocket wheel 81. A spring 84, coiled about the beater shaft and reacting laterally between the sprocket wheel 81 and the supporting bracket 61, serves to urge the sprocket wheel 81 toward the crank arm 80 to bring the two series of clutch teeth 82, 83, into engagement.

A cam plate 85, rotatably mounted upon the hub of the sprocket wheel 81, serves for moving the sprocket wheel away from the hub of the crank arm 80 against the effort of the spring 84, to disengage the clutch teeth 82, 83. The cam plate 85 reacts between the adjacent side face of the sprocket wheel 81 at one side, and a stationary collar 86 at the other side. The collar 86 incloses the clutch teeth 82, 83. It may be held in position in any convenient way. As shown, it is integrally connected with a part of the bracket arm 61 through arms 87, 88. These arms extend about the sprocket wheel 81 (Fig. 1).

Provision is preferably made for automatically turning the cam plate 85 when the apron reaches the limit of its movement in each direction. As shown, the cam plate 85 is provided with a crank arm 89. A rod 90 (Figs. 1 and 5) connects this crank arm with a lever 91 located near the front end of the machine. The lever 91 is pivotally mounted at 92 upon the angle iron 24 of the intermediate sill 16, and extends laterally therefrom to its point of connection with the rod 90 beyond the side sill 15. A spring 93, connected at one end with the lever 91 and at its other end with the angle iron 22 of the side sill 14, serves to yieldingly hold the lever arm 91 in position when so moved as to bring the spring to either side of the lever pivot 92.

A shipper rod 94 is provided for shifting the lever 91. This shipper rod is pivotally connected to the lever 91 at its forward end and extends rearwardly therefrom through the frame of the machine. As shown, it rests loosely upon the transverse sills 18, 19 and 20, and extends through an apertured contact lug 95 (Fig. 6) carried by and depending from the forward one of the slats 10 of the apron. Stops 96 and 97 are mounted upon the shipper rod 94 adjacent its opposite ends for engagement by the contact lug 95 to shift the rod 94 and move the lever 91. Preferably one of the stops, as 97, is adjustably mounted upon the shipper rod, as by being made in the form of a threaded nut which runs upon a threaded part 98 of the rod.

The crank-arm 80 is connected by a link 99 with a pawl arm 100. The pawl arm 100 is pivotally mounted upon a stub shaft 101. This stub shaft projects outwardly from a rigid part of the frame of the machine, as from the inner end portion of the bracket arm 61 (Fig. 7). The pawl arm 100 is preferably strengthened by being made in the form of a yoke. A gear wheel 102 and a sprocket wheel 103 are journaled on the stub shaft 101 between the arms of the yoke. These wheels preferably turn together upon the stub shaft 101. To that end they are conveniently formed integral, as shown.

The pawl 104 of the pawl arm 100 plays over the gear wheel 102. For adjustably regulating the effective stroke of the pawl a shield 105 is provided. This shield is shown as being carried by a crank-arm 106, pivotally mounted upon the outer end of the stub shaft 101. A hand lever 107 is provided for adjustably moving the shield 105. This hand lever is conveniently mounted adjacent the forward end of the machine at that side remote from the hand lever 74. It is shown as being pivoted at its lower end upon a bracket 108 carried by the side sill 16, and extends upwardly therefrom to within convenient reach from the driver's seat. A notched quadrant 109, mounted upon the side plate 32 adjacent the hand lever 107, serves for holding the hand lever in adjusted position. A rod 110 operatively connects the hand lever 107 with the movable shield 105.

The gear wheel 102 meshes with a pinion 111 fixed upon the adjacent end of the rear apron shaft 112. The turning of the shaft 112 serves for communicating motion to the drive chain 37 for moving the apron, as through a worm wheel 113 mounted on the shaft 112 and meshing with the worm wheel 43. The sprocket wheels 81 and 103 are operatively connected by a chain 114, whereby the sprocket wheel 103 and gear 102 are driven from the sprocket wheel 81 when the clutch teeth 82, 83, are engaged. At such times the wheel 102 is so rotated that its periphery moves in advance of the pawl 104, and the pawl arm 100, while being continuously oscillated, is not effectively operative.

During the discharge of the load the clutch teeth 82, 83, will be disengaged, whereby the apron is moved to advance the load upon the beater 13 by the engagement of the pawl 104 with the gear 102. The rate at which the apron is moved during this part of the operation is regulated by using the hand lever 107 to adjust the position of the pawl shield 105. When the load has been completely discharged the contact lug 95 (Fig. 6) engages the stop 97 on the rear end of the shipper rod 94 (Fig. 1) and swings the lever 91 to turn the cam plate 85 (Fig. 9). This permits the sprocket wheel 81 to be moved outwardly by the spring 84, and its clutch teeth 83 are brought into engagement with the clutch teeth 82 upon the hub of the crank arm 80. The gear wheel 102 is now rotated in the same direction as before, but at a greater speed. The direction of travel of the apron having been reversed by the movement of the stud 56 (Fig. 6) about the sprocket wheel 38, it is returned to the loading position by driving the machine through a short distance over the ground.

When the contact lug 95 reaches the stop 96 upon the forward end of the shipper rod 94, the lever 91 is pushed forwardly and rotates the cam plate 84 to release the sprocket wheel 81. The cam lug 79 now contacts with the hand lever 74 to disengage it from the stop shoulder 77, and the spring 78 serves to straighten the toggle links 69, 70, and raise the sprocket chain 64 out of engagement with the sprocket wheel 63. The operative parts of the machine are thereby brought to rest.

The invention provides a manure spreader which may be completely constructed of metal, and which is durable and certain in operation. If desired the frame of the machine may be strengthened by the use of truss rods, one of which is shown at 115 (Fig. 2). This truss rod is connected at its rear end to the outer end of the bracket arm 60 and extends diagonally upward therefrom to pass over a bolt 116 mounted on one of the uprights 33, and thence diagonally downward. The forward end of the truss rod is connected to the angle bar 21 of the side sill 14, as at 117.

It is usually desirable to provide a guard for engaging the top of the load immediately in front of the beater 13. For supporting such a guard we preferably extend the uprights 33, 34, at the rear of the frame above the side plates 31, 32. The guard comprises a shaft 118, and a plurality of arms 119 fixed in the shaft 118 and extending radially outward therefrom. The shaft 118 is journaled adjacent its opposite ends in the extended uprights 33, 34.

A spring 120 is preferably employed to yieldingly hold the arms 119 of the guard in contact with the top of the load. For this purpose the spring 120 is connected at its opposite ends to the side plate 32 adjacent the upright 34, and to a crank arm 121 mounted on the shaft 118 at the corresponding side of the machine. The construction provides a guard which will effectually prevent the beater 13 from discharging the load in irregular quantities.

We claim as our invention—

1. In a manure spreader, in combination, a reversely movable hopper bottom, an endless drive chain moving in one direction only and arranged in parallel lengths extending in the direction of movement of the hopper bottom, and connection between a link of the chain and the hopper bottom.

2. In a manure spreader, in combination, a frame, a slatted apron having its ends connected, and means for reciprocating the apron in the frame comprising an endless drive chain moving in one direction only and arranged in parallel lengths, and connection between a link of the drive chain and a slat of the apron.

3. In a manure spreader, in combination, a longitudinally reciprocable hopper bottom having a transverse slot, an endless drive chain arranged in a horizontal loop below the hopper bottom, and a stud mounted on a link of the chain and extending into the said transverse slot of the hopper bottom.

4. In a manure spreader, in combination, a frame, a pair of horizontally disposed guide wheels one adjacent each end of the frame, a pair of vertically disposed guide wheels one adjacent each end of the frame, the vertically disposed guide wheel at the rear end of the frame being located beyond the horizontally disposed guide wheel at the same end of the frame, a slatted apron having its ends connected to form a loop turning over the vertically disposed guide wheels, a slat of the apron adjacent its forward end having a transverse slot, an endless drive chain turning over the horizontally disposed guide wheels, and a stud mounted on the drive chain and entering the said slot of the apron slat.

5. In a manure spreader, in combination, a body having wheels, a shaft turned by the said wheels, an apron shaft, means for driving the apron shaft from the first mentioned shaft at different speeds in the same direction comprising a crank fixed on the first mentioned shaft, a ratchet wheel fixed on the apron shaft, a swinging pawl arm coöperating with the ratchet wheel, a link connecting the crank and pawl arm, a sprocket wheel on each of said shafts, a chain connecting the sprocket wheels and a clutch controlling one of the sprocket wheels.

6. In a manure spreader, in combination, a shaft, a beater mounted on said shaft, means for driving the shaft, a feed apron, and means for reversely driving the feed apron at different speeds in the two directions comprising an apron feed shaft, an endless chain, connection between a link of the chain and the apron, a guide wheel for the endless chain located adjacent each end of the apron travel, gear connection between the apron feed shaft and one of the guide wheels, clutch-controlled gear connection between the first-mentioned shaft and the apron feed shaft, ratchet and pawl mechanism on the apron feed shaft, a crank arm on the first-mentioned shaft, and operative connection between the crank arm and the ratchet and pawl mechanism.

JOHN C. POPE.
WILLIAM J. POPE.

Witnesses:
 N. H. HINCKLEY,
 GEORGIA E. HISCOCK.

---

Copies of this patent may be obtained for five cents each, by addressing the "Commissioner of Patents, Washington, D. C."